United States Patent Office 3,144,456
Patented Aug. 11, 1964

3,144,456
MONO AND BIS N-ALKANOYLMETHYL QUATERNARY AMMONIUM SALTS OF TRIETHYLENEDIAMINE
Robert B. Moffett, Kalamazoo, Mich., assignor to The Upjohn Company, Kalamazoo, Mich., a corporation of Delaware
No Drawing. Filed Dec. 20, 1963, Ser. No. 332,247
5 Claims. (Cl. 260—268)

This invention relates to mono and bis quaternary ammonium salts of triethylenediamine and to processes for their preparation and is more particularly concerned with the mono and bis N-alkanoylmethyl quarternary ammonium salts of triethylenediamine and with processes for their preparation.

The compounds of the invention can be represented by the follownig formulae:

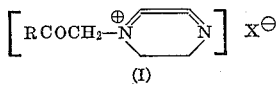

(I)

and

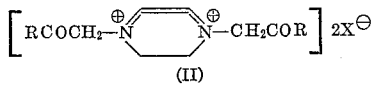

(II)

wherein R is alkyl containing from 1 to 4 carbon atoms, inclusive, and X is the anion of a pharmacologically acceptable acid. The compounds of the invention also include the acid addition salts of the free bases of Formula I with pharmacologically acceptable acids, and the N-oxides of the compounds of Formula I and the acid addition salts of said N-oxides with pharmacologically acceptable acids.

The term "alkyl containing from 1 to 4 carbon atoms inclusive" means methyl, ethyl, propyl, butyl and isomeric forms thereof. The term "pharmacologically acceptable acids" is well recognized in the art and is inclusive of acids such as sulfuric, hydrochloric, hydrobromic, hydriodic, nitric, phosphoric, lactic, benzoic, mathanesulfonic, p-toluenesulfonic, salicylic, acetic, propionic, maleic, malic, tartaric, citric, cyclohexylsulfamic, succinic, nicotinic, ascorbic acids and the like.

The novel compounds of the invention, i.e., the compounds of Formulae I and II above, the N-oxides of compounds of Formula I, and the acid addition salts of the compounds of Formula I and the N-oxides thereof with pharmacologically acceptable acids, possess pharmacological activity. Illustratively the compounds of the invention show antibacterial activity, ganglionic blocking activity, and central nervous system depressant activity. The antibacterial activity of the compounds of the invention renders them valuable for the control of bacterial organisms, both systemically and topically in mammals, and also for sterilization purposes, for example in the sterilization of surgical instruments and in related fields.

For purposes of administration to mammals, including animals of economic value, the novel compounds of the invention can be combined with solid and liquid parmaceutical carriers and formulated in the form of tablets, powder packets, capsules and like solid dosage forms using starch and like excipients, or dissolved or suspended in suitable solvents or vehicles for oral or parenteral administration.

The novel compounds of the invention can be prepared conveniently by reacting triethylenediamine with the appropriate halide RCOCH₂HAl wherein R is as hereinbefore defined and Hal represents a halogen atom, preferably bromine or chlorine. The reaction is carried out advantageously in the presence of an inert solvent, for example, an alkanone such as acetone, methyl ethyl ketone, methyl isopropyl ketone and the like, or an alkanol such as methanol, ethanol, butyl alcohol and the like. Where the required product is the mono quaternary ammonium salt of formula I the triethylenediamine and the halide can be employed in approximately stoichiometric quantities, i.e., equimolar quantities. It is preferred, however, to employ the triethylenediamine in excess, e.g., 100% excess. Where the required product is the bis quaternary ammonium salt of Formula II the quantities of reactants can be approximately stoichiometric, i.e., about 2 moles of the halide per mole of triethylenediamine. It is preferred, however, to employ the halide in excess, e.g., 25% excess.

The reaction is generally conducted at a temperature of the order of 20 to 30° C., although higher or lower temperatures can be employed if desired. Generally speaking the required product separates from solution and is isolated by filtration. If desired the compound so obtained can be purified by conventional procedures, for example by recrystallization.

Unsymmetrical quaternary compounds of Formula II, i.e., compounds of Formula II in which the two R groups are different, can be prepared by reacting a mono quaternary compound I with a halide, RCOCH₂Hal (wherein R and Hal are as hereinbefore defined) in which the group R differs from that in the mono quarternary compound starting material.

The anion of the quaternary ammonium salts obtained as described above can be exchanged for any other desired anion, for example the anions of other pharmacologically acceptable acids, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The acid addition salts of the compounds of Formula I above can be prepared by reacting the compound of Formula I with a pharmacologically acceptable acid in the presence of an inert solvent such as water, ether, and lower alkanols such as methanol, ethanol and the like.

The N-oxide compounds of the invention can be prepared by methods well known in the art, for example, by reacting the free base of the Formula I with an oxidizing agent such as hydrogen peroxide, peracetic acid, Caro's acid, and the like. Advantageously, the reaction is carried out at ordinary temperatures (e.g., of the order of 20 to 30° C.) in the presence of an inert solvent such as benzene, chloroform, lower-alkyl alkanoates such as ethyl acetate, and lower alkanols such as methanol, ethanol, isopropyl alcohol, and the like. Suitably the oxidizing agent is employed in at least stoichiometric proportion with respect to the free base I and preferably the oxidizing agent is present in a slight excess. When the reaction has been completed, any excess of oxidizing agent can be removed by treating the reaction mixture with an agent such as platinum, palladium, Raney nickel, and inorganic hydrosulfites, such as sodium hydrosulfite, and the like.

The N-oxide acid addition salts of the invention can be prepared from the corresponding N-oxide and a pharmacologically acceptable acid using the procedures hereinbefore described for the preparation of the acid addition salts of the compounds I.

The halides RCOCH₂Hal employed in the process of the invention are for the most part known and can be prepared by treating the appropriate acid chloride with diazomethane and treating the resulting diazoketone with the appropriate hydrogen halide. For example, see Organic Syntheses 26, 13 (1946).

For the sake of simplicity the well-known trivial name triethylenediamine is employed herein. For indexing purposes Chemical Abstracts employs the systematic name 1,4-diazabicyclo[2.2.2]octane for this diamine. The system of nomenclature used in naming the novel quaternary ammonium compounds of this invention is consistent with Chemical Abstracts practice.

The following examples illustrate the best method contemplated by the inventor for carrying out his invention.

*Example 1.—1-Acetonyl-4-Aza-1-Azoniabicyclo[2.2.2] Octane Chloride*

A solution of 18.5 g. (0.2 mole) of chloroacetone in 100 ml. of methyl ethyl ketone was added dropwise with stirring over a period of 1.15 hr. to a warm solution of 44.8 g. (0.4 mole) of triethylene diamine in 400 ml. of methyl ethyl ketone. The resulting mixture was cooled and the solid which had separated was isolated by filtration and dried. There was thus obtained 43.3 g. of solid which on recrystallization from a mixture of methanol, methyl ethyl ketone and hexane afforded 1-acetonyl-4-aza-1-azoniabicyclo[2.2.2]octane chloride in the form of a hemihydrate having a melting point of 282° C. (with decomposition).

*Analysis.*—Calcd. for $C_9H_{17}ClN_2O \cdot \frac{1}{2}H_2O$: C, 50.58; H, 8.49; N, 13.11; Cl, 16.59. Found: C, 50.23; H, 8.58; N, 13.24; Cl, 1709.

*Example 2.—1-Acetonyl-4-Aza-1-Azoniabicyclo[2.2.2] Octane Chloride Hydrochloride*

A solution of 42.8 g. of 1-acetonyl-4-aza-1-azoniabicyclo[2.2.2]octane chloride in 500 ml. of absolute methanol was acidified by the addition of methanolic hydrogen chloride. The resulting solution was cooled and the solid which had separated was isolated by filtration and dried in vacuo. There was thus obtained 43.13 g. of 1-acetonyl-4-aza-1-azoniabicyclo[2.2.2]octane chloride hydrochloride in the form of monohydrate having a melting point of 250° C. (with decomposition). The melting point remained unchanged after recrystallization from absolute methanol followed by recrystallization from 90% methanol.

*Analysis.*—Calcd. for $C_9H_{18}Cl_2N_2O \cdot H_2O$: C, 41.70; H, 7.78; N, 10.81; Cl, 27.36. Found: C, 42.98; H, 7.61; N, 10.58; Cl, 27.63.

*Example 3.—1,4 - Diacetonyl-1,4-Diazoniabicyclo[2.2.2] Octane Dichloride*

To a solution of 22.5 g. (0.2 mole) of triethylenediamine in 50 ml. of methanol was added slowly 46.0 g. (0.5 mole) of chloroacetone. The solution became warm and refluxed. The mixture was allowed to stand for 1.5 hr. after the addition was complete at which time 170 ml. of methyl ethyl ketone was added. The solid which separated was isolated by filtration and dried in vacuo. There was thus obtained 18.2 g. of 1,4-diacetonyl-1,4-diazoniabicyclo[2.2.2]octane dichloride in the form of a monohydrate having a melting point of about 285° C. (with decomposition; sintering from 220° C.) This material was recrystallized from 90% ethanol to give 11.3 g. of recrystallized compound of unchanged melting point.

*Analysis.*—Calcd. for $C_{12}H_{22}Cl_2N_2O_2 \cdot H_2O$: C, 45.72; H, 7.67; N, 8.89; Cl, 22.49. Found: C, 45.61; H, 7.54; N, 8.72; Cl, 22.20.

*Example 4.—1-(Propionylmethyl) - 4 - 1-Azoniabicyclo- [2.2.2]Octane Bromide*

Using the procedure described in Example 1, but replacing chloroacetone by ethyl bromomethyl ketone, there can be obtained 1-(propionylmethyl)-4-aza-1-azoniabicyclo[2.2.2]octane bromide in the form of a crystalline solid.

Similarly, using the procedure described in Example 1, but replacing chloroacetone by isopropyl bromomethyl ketone, propyl bromomethyl ketone, butyl bromomethyl ketone, and isobutyl bromomethyl ketone, there can be obtained 1-(isobutyrylmethyl)-, 1-(butyrylmethyl)-, 1-(valerylmethyl)-, and 1-(isovalerymethyl)-4-aza-1-azoniabicyclo[2.2.2]octane bromides, respectively.

*Example 5.—1,4-Di(Propionylmethyl- 1,4 - Diazoniabicyclo[2.2.2]Octane Dibromide*

Using the procedure described in Example 3, but replacing chloroacetone by ethyl bromomethyl ketone, there can be obtained 1,4-di(propionylmethyl) - 1,4 - diazoniabicyclo[2.2.2]octane dibromide.

Similarly, using the procedure described in Example 3, but replacing chloroacetone by isopropyl bromomethyl ketone, propyl bromomethyl ketone, butyl bromomethyl ketone, and isobutyl bromomethyl ketone, there can be obtained 1,4 - di(isobutyrylmethyl)-, 1,4 - di(butyrylmethyl)-, 1,4-di(valerylmethyl)-, and 1,4-di(isovalerylmethyl)-1,4-diazoniabicyclo[2.2.2]octane dibromides, respectively.

*Example 6.—1-Acetonyl - 4 - (Propionylmethyl)-1,4-Diazoniabicyclo[2.2.2]Octane Dichloride*

Using the procedure described in Example 1, but replacing chloroacetone by ethyl chloromethyl ketone and replacing triethylenediamine by 1-acetonyl-4-aza-1-azoniabicyclo[2.2.2]octane chloride, there can be obtained 1-acetonyl - 4 - (propionylmethyl) - 1,4 - diazoniabicyclo- [2.2.2]octane dichloride.

Similarly, other unsymmetrical bis quaternary ammonium salts of the invention can be obtained by reacting the appropriate mono quaternary ammonium salt with the appropriate alkyl halomethyl ketone.

*Example 7.—1-(Propionylmethyl) - 4 - Aza-1-Azoniabicyclo[2.2.2]Octane Bromide Hydrobromide*

This compound can be prepared as follows: To a solution of 1 g. of 1-(propionylmethyl)-4-aza-1-azoniabicyclo[2.2.2]octane bromide in 100 ml. of absolute methanol is added dropwise, with stirring, a slight excess of a 0.1 N ethereal solution of hydrogen bromide. The solid which separates is isolated by filtration and dried. There can thus be obtained 1-(propionylmethyl)-4-aza-1-azoniabicyclo[2.2.2]octane bromide hydrobromide.

*Example 8. — 1,4-Diacetonyl-1,4-Diazoniabicyclo[2.2.2] octane Dibromide*

This compound can be prepared as follows: A solution of 1,4-diacetonyl-1,4-diazoniabicyclo[2.2.2]octane dichloride in water is shaken with a suspension of silver oxide until the precipitation of silver chloride is complete. The resulting mixture is filtered and the filtrate containing the corresponding quaternary ammonium hydroxide is neutralized by the addition of aqueous hydrobromic acid. By evaporating the resulting mixture to dryness, 1,4-diacetonyl-1,4-diazoniabicyclo[2.2.2]octane dibromide can be obtained.

Similarly, using the above procedure, but replacing hydrobromic acid by other acids such as hydriodic, sulfuric, phosphoric, acetic, methanesulfonic and like acids, there can be obtained the corresponding quaternary ammonium salts.

In like manner, using the above procedure, the anion of any of the mono or bis quaternary ammonium salts of the invention can be exchanged by any other desired anion by forming the corresponding quaternary ammonium hydroxide and reacting the latter with the appropriate acid. When a mono quaternary ammonium salt is employed as starting material in the above procedure, excess acid can be used in the neutralization to give the desired mono quaternary ammonium salt in the form of the corresponding acid addition salt.

*Example 9. — 1-Acetonyl-4-Aza-1-Azoniabicyclo[2.2.2] octane N-Oxide Chloride*

This compound can be prepared as follows: To a solution of 1 g. of 1-acetonyl-4-aza-1-azoniabicyclo[2.2.2]octane chloride in 50 ml. of absolute ethanol is added an aquimolar quantity of 30% hydrogen peroxide. The mixture is allowed to stand for 4 days at room temperature, at the end of which time the mixture is shaken with 0.5 g. of finely divided platinum until a test for peroxide is negative. The mixture is then filtered and the filtrate is evaporated to dryness under reduced pressure. There can thus be obtained 1-acetonyl-4-aza-1-azoniabicyclo-[2.2.2]octane N-oxide chloride.

The N-oxide so obtained can be converted to its hydrochloride by using the procedure described in Example 2.

Similarly, using the procedure of Example 9, other mono quaternary ammonium salts of the invention can be converted to the corresponding N-oxides and N-oxide acid addition salts.

I claim:
1. A compound selected from the class consisting of (a) mono and bis quaternary ammonium salts of triethylenediamine having the formulae:

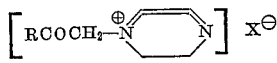

and

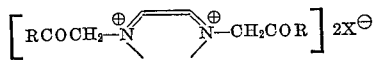

wherein R is alkyl containing from 1 to 4 carbon atoms, inclusive, and X is the anion of a pharmacologically acceptable acid, and (b) the acid addition salts of the above mono quaternary ammonium salts with pharmacologically acceptable acids.

2. 1-acetonyl-4-aza-1-azoniabicyclo[2.2.2]octane chloride.

3. 1-acetonyl-4-aza-1-azoniabicyclo[2.2.2]octane chloride hydrochloride.

4. 1,4-diacetonyl-1,4-diazoniabicyclo[2.2.2]octane dichloride.

5. A compound selected from the class consisting of (a) N-oxides having the formula:

wherein X is the anion of a pharmacologically acceptable acid and R is alkyl containing from 1 to 4 carbon atoms, inclusive, and (b) the acid addition salts of N-oxides of the above formula with pharmacologically acceptable acids.

References Cited in the file of this patent

Oae et al: Journal Organic Chemistry, vol. 24, pp. 1348–1349 (1959).

UNITED STATES PATENT OFFICE
CERTIFICATE OF CORRECTION

Patent No. 3,144,456                          August 11, 1964

Robert B. Moffett

It is hereby certified that error appears in the above numbered patent requiring correction and that the said Letters Patent should read as corrected below.

Column 1, lines 60 and 61, for "parmaceutical" read -- pharmaceutical --; line 68, for "RCOCH₂HAl" read -- RCOCH₂Hal --; column 3, line 27, for "Cl, 1709" read -- Cl, 17.09 --; line 44, for "C, 42.98" read -- C, 42.08 --; line 65, for "-4-1-", in italics, read -- -4-Aza-1- --, in italics; column 4, line 3, for "1-(isovalerymethyl)" read -- 1-(isovalerylmethyl) --; column 5, line 3, for "aquimolar" read -- equimolar --; lines 25 to 26, for that portion of the formula reading:

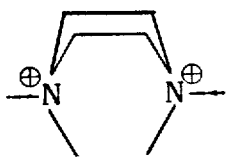                        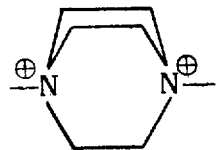

Signed and sealed this 22nd day of December 1964.

(SEAL)
Attest:

ERNEST W. SWIDER                        EDWARD J. BRENNER
Attesting Officer                        Commissioner of Patents